United States Patent
Celentano et al.

(10) Patent No.: US 8,320,904 B1
(45) Date of Patent: *Nov. 27, 2012

(54) METHOD AND SYSTEM FOR REMOTELY ACCESSING AND TROUBLESHOOTING CELLULAR WIRELESS COMMUNICATION DEVICES

(75) Inventors: Frank Celentano, Damascus, MD (US); Alex Shusterman, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 740 days.

This patent is subject to a terminal disclaimer.

(21) Appl. No.: 11/695,713

(22) Filed: Apr. 3, 2007

(51) Int. Cl.
*H04W 24/00* (2009.01)
*G06F 15/167* (2006.01)

(52) U.S. Cl. ........................................ 455/423; 709/224

(58) Field of Classification Search .................. 455/423, 455/9, 97.11, 67.13; 707/10; 709/219, 217, 709/224
See application file for complete search history.

(56) References Cited

U.S. PATENT DOCUMENTS

| | | | |
|---|---|---|---|
| 5,778,368 A * | 7/1998 | Hogan et al. ................... | 707/10 |
| 5,946,665 A | 8/1999 | Suzuki et al. | |
| 5,987,306 A | 11/1999 | Nilsen et al. | |
| 6,094,213 A | 7/2000 | Mun et al. | |
| 6,282,569 B1 * | 8/2001 | Wallis et al. .................. | 709/224 |
| 6,429,855 B2 | 8/2002 | Pabon et al. | |
| 6,529,724 B1 | 3/2003 | Khazaka et al. | |
| 6,615,253 B1 * | 9/2003 | Bowman-Amuah .......... | 709/219 |
| 6,725,228 B1 | 4/2004 | Clark et al. | |
| 6,754,470 B2 | 6/2004 | Hendrickson et al. | |
| 6,959,182 B2 | 10/2005 | Lingafeldt et al. | |
| 7,080,141 B1 | 7/2006 | Baekelmans et al. | |
| 7,126,626 B2 | 10/2006 | Sawahara et al. | |
| 7,206,548 B1 * | 4/2007 | Sumler et al. ............... | 455/67.11 |
| 7,283,816 B2 * | 10/2007 | Fok et al. ....................... | 455/423 |
| 7,379,977 B2 | 5/2008 | Walrath | |
| 7,526,322 B2 * | 4/2009 | Whistler ....................... | 455/566 |
| 2002/0069037 A1 | 6/2002 | Hendrickson et al. | |
| 2002/0127993 A1 | 9/2002 | Zappala | |
| 2003/0058275 A1 | 3/2003 | Pilu et al. | |
| 2004/0002326 A1 | 1/2004 | Maher | |
| 2004/0058652 A1 | 3/2004 | McGregor et al. | |
| 2004/0098456 A1 | 5/2004 | Krzyzanowski et al. | |
| 2004/0199303 A1 | 10/2004 | Ohmura et al. | |
| 2005/0062850 A1 | 3/2005 | Lin | |

(Continued)

OTHER PUBLICATIONS

Spirent Communications, "Universal Tool Suite (UTS) New! UTS," 2001.

(Continued)

*Primary Examiner* — Dwayne Bost
*Assistant Examiner* — Kuo Woo

(57) ABSTRACT

A method and system for remote troubleshooting of a wireless communication device, such as a cell phone. The cell phone is programmed with server logic, such as a Telnet server application and an FTP server application. A computer at a customer service center for instance is programmed with client logic, such as a Telnet client application and an FTP client application. When a customer service representative receives a call reporting trouble with the cell phone, the representative may conveniently operate the client logic on the computer to log into the cell phone server logic, via a packet-switched network such as the Internet and via a wireless access network (and thus an air interface) serving the cell phone. Through that connection, the customer service representative can thereby cause the cell phone to perform various performance evaluations and can download the evaluation results to conveniently facilitate troubleshooting of the cell phone trouble.

19 Claims, 4 Drawing Sheets

U.S. PATENT DOCUMENTS

| | | | |
|---|---|---|---|
| 2005/0114504 | A1 | 5/2005 | Marolia et al. |
| 2005/0212927 | A1 | 9/2005 | Hamamura et al. |
| 2005/0213511 | A1 | 9/2005 | Reece, Jr. et al. |
| 2006/0033809 | A1 | 2/2006 | Farley |
| 2006/0217116 | A1* | 9/2006 | Cassett et al. ............... 455/423 |
| 2007/0053513 | A1 | 3/2007 | Hoffberg |

OTHER PUBLICATIONS

TestQuest, "Interface for UTS Phones," 2004.

Symantec, Inc., "pcAnywhere™" http://www.symantec.com/pcanywhere/Consumer, printed from the World Wide Web on Oct. 1, 2004.

IBM, "Experience Remote Usability Testing, Part 1," http://www-106.ibm.com/developerworks/web/library/wa-rmusts1/, printed from the World Wide Web on Jul. 29, 2004.

U.S. Appl. No. 10/977,142, filed Oct. 29, 2004, entitled "Method and System for Network-Based Remote Control and Testing of Wireless Communication Devices".

U.S. Appl. No. 11/058,863, filed Feb. 16, 2005, entitled "Method, Apparatus, and System for Monitoring User-Interface Operation to Facilitate Analysis and Report Generation".

Office Action from U.S. Appl. No. 10/977,142, dated Nov. 2, 2006.

Office Action from U.S. Appl. No. 11/058,863, dated Jun. 28, 2006.

Office Action from U.S. Appl. No. 11/058,863, dated Dec. 18, 2006.

Ortiz, "Introduction to OTA Application Provisioning," http://developers.sun.com/mobility/midp/articles/ota/, printed from the World Wide Web, Nov. 2002.

Office Action from U.S. Appl. No. 11/058,863, dated Apr. 2, 2007.

Office Action from U.S. Appl. No. 11/058,863, dated Sep. 13, 2007.

Office Action from U.S. Appl. No. 11/058,863, dated Jul. 31, 2008.

Office Action from U.S. Appl. No. 11/058,863, dated Apr. 2, 2009.

Office Action from U.S. Appl. No. 11/058,863, dated Oct. 5, 2009.

Office Action from U.S. Appl. No. 11/058,863, dated Mar. 30, 2010.

* cited by examiner

METHOD AND SYSTEM FOR REMOTELY ACCESSING AND TROUBLESHOOTING CELLULAR WIRELESS COMMUNICATION DEVICES

FIELD OF THE INVENTION

The present invention related to cellular wireless communications and, more particularly, to troubleshooting of problems experienced by cellular wireless communication devices such as cell phones for instance.

BACKGROUND

In typical practice, when a user of a cell phone experiences service problems or problems with operation of the cell phone, the user will call or visit a customer service center operated by the user's wireless service provider, and a customer service representative will attempt to troubleshoot the problem.

With an in-person visit to a customer service center, the customer service representative technician can readily evaluate the cell phone and its communication service at the center, by physically operating the cell phone, applying various test equipment to test the phone, and testing the phone's wireless communication functionality. Unfortunately, however, it may be inconvenient for a user to bring the cell phone into a customer service center. Furthermore, the cell phone problems experienced by the user may relate to environmental conditions (such as air interface or wireless network infrastructure conditions) where the user normally operates the cell phone, and those environmental conditions may not be present at the customer service center. Thus, testing the cell phone and troubleshooting the user's problems at the customer service center may prove to be fruitless or wasteful.

For the user's convenience, and to provide more relevant troubleshooting, it would therefore be better to have a user call into the customer service center when the user is experiencing problems, and have the customer service center try to troubleshoot the problems at that time. In practice, when the user calls in, the customer service technician may walk through various troubleshooting tasks with the user, such as to ask the user to press certain buttons on the cell phone and to report to the technician what the cell phone does and how things work. If the technician thereby learns of more substantial problems regarding the phone, the technician can ask the user to bring the cell phone into a customer service center for work. Further, if the technician thereby learns of problems with the wireless network, the technician can write a trouble ticket to initiate network repairs.

Still unfortunately, however, the process of having a user walk through troubleshooting efforts with a customer service technician can be burdensome and confusing for the user. Additionally or as a result, the technician may be unable to gain sufficient information about the operation of the cell phone and its environment to be able to take appropriate remedial action.

Consequently, an improvement is desired.

SUMMARY

The present invention is directed to a method and system for over the air troubleshooting of a wireless communication device such as a cell phone. In accordance with an exemplary embodiment of the invention, a customer service technician will operate a computer terminal that will log in to the cell phone through a wireless packet data connection to the cell phone, such as through a Telnet or SSH session, and will then cause the cell phone to perform various troubleshooting tasks. Further, the customer service technician may then operate the computer terminal to log in to the cell phone through an FTP session, an SFTP (SSH FTP) session, or the like, in order to download test results, such as performance metrics, collected by the cell phone. The test results can then be used by the technician, the computer, or some other person or system, to evaluate trouble experienced by the cell phone.

In the exemplary embodiment, the customer service technician may initiate a log in to the cell phone in response to a customer service call placed by the cell phone user. For instance, the user may call the customer service center (with the cell phone or with another phone) to report trouble that the user is experiencing with use of the cell phone. Rather than having the user substantially assist a customer service technician with the troubleshooting effort, the technician may then simply operate a customer service computer terminal to establish a Telnet or SSH session with the cell phone, and through that session, the technician may direct the cell phone to perform various tests and to collect various test results. Further, the technician may then later operate the customer service computer to log in to the cell phone and to download the test results. These functions could be automated on the customer service computer.

To facilitate implementation of the invention in practice, the cell phone will be programmed with one or more server applications, and the customer service computer will be programmed with one or more corresponding client applications operable to log in to the cell phone's server applications via a packet-data network.

For instance, the cell phone may be programmed with a basic Telnet server application, of the same type that is commonly found on server computers throughout the Internet, and the customer service computer may be programmed with a corresponding Telnet client application. Further, the cell phone may be programmed with a basic FTP server application, of the same type that is commonly found on server computers through the Internet, and the customer service computer may be programmed with a corresponding FTP client application. Provided with an IP address of the cell phone, the customer service computer can thus log in to the cell phone in much the same way that a computer would log in to a conventional server, and the customer service technician can thereby function as a terminal to operate the cell phone, so as to cause the cell phone to take various actions, and to download various test results for use in troubleshooting.

In one respect, an exemplary embodiment of the invention may thus take the form of a method that involves conveying (e.g., selling or otherwise distributing) to a user a cellular wireless communication device (WCD) such as a cell phone that is programmed with at least one server application, thereafter receiving a trouble report regarding operation of the WCD, and responsively performing remote evaluation of the WCD.

According to the method, the act of performing the remote evaluation of the WCD involves operating a computer to remotely log in to the WCD via a packet-switched network and via a wireless access network serving the WCD, and through the resulting data session, (i) causing the WCD to conduct at least evaluation regarding operation of the WCD and (ii) downloading to the computer from the WCD the results of the evaluation (s).

More particularly, the act of performing the remote evaluation of the WCD may involve first using at least one client application on the computer to log in to the at least one server application on the WCD via a packet-switched network and via a wireless access network serving the WCD and to thereby establish at least one data session between the computer and the WCD via the packet-switched network and the wireless access network. In turn, the act may then involve communicating with the WCD through the at least one data session, so as to cause the WCD to conduct one or more evaluations regarding operation of the WCD and so as to download to the computer from the WCD one or more results of the one or more evaluations, for use in troubleshooting the reported trouble.

In the exemplary method, the wireless access network may serve the WCD through an air interface under any of a variety of cellular air interface protocols, such as CDMA, iDEN, TDMA, WiMAX, GSM, GRPS, UMTS, EDGE, and/or LTE, for instance. Each of the one or more data sessions established between the computer and the WCD may thus extends through that air interface.

The exemplary method may be carried out by a wireless service provider that provides the WCD with communication service. The wireless service provider may sell the WCD to the user, either directly or indirectly (such as through one or more distribution channels for instance). Further, the wireless service provider or some other entity may operate a customer service center to handle questions (e.g., technical service questions) from users, and the act of receiving the trouble report may involve receiving a call from the user (e.g., from the WCD) to that customer service center and receiving the trouble report from the user. The computer that logs in to the WCD remotely may then be a computer operated by a customer service representative who answers the call.

In the exemplary method, the at least one client application on the computer may comprise a Telnet client application, and the at least one server application on the WCD may comprise a corresponding Telnet server application. In that case, the act of using the at least one client application on the computer to log in to the at least one server application on the WCD via the packet-switched network and via a wireless access network serving the WCD and to thereby establish at least one data session between the computer and the WCD via the packet-switched network and the wireless access network may involve using the Telnet client application to log in to the Telnet server application. Further, the at least one data session between the computer and the WCD may thus comprise a Telnet session between the computer and the WCD.

In this arrangement, the act of communicating with the WCD through the at least one data session, so as to cause the WCD to conduct one or more evaluations regarding operation of the WCD and so as to download to the computer from the WCD one or more results of the one or more evaluations, may involve sending one or more commands from the computer via the Telnet session, and thus via the packet-switched network and wireless access network, to the WCD to cause the WCD to conduct the one or more evaluations.

In addition, the at least one client application on the computer may further comprise an FTP client application, and the at least one server application on the WCD may further comprise an FTP server application. In that case, the at least one data session between the computer and the WCD may also comprise an FTP session between the computer and the WCD. Further, the act of communicating with the WCD through the at least one data session so as to download to the computer from the WCD one or more results of the one or more evaluations may involve engaging in FTP file transfer to download the one or more results from the WCD to the computer via the packet-switched network and wireless access network.

The exemplary method may additionally involve the computer ascertaining one or more characteristics of the WCD, through the at least one data session. For instance, the computer may send to the WCD one or more commands to read the one or more characteristics from the WCD, and the computer may receive in response from the WCD indications of the one or more characteristics. Examples of such characteristics include (i) a network communication setting of the WCD, such as a server IP address stored in the WCD, a frequency, code, or other communication parameter being used by the WCD to communicate, a preferred roaming list stored in the WCD, or other network communication settings, (ii) a battery power level of the WCD, (iii) a version of software or firmware in the WCD, such as a version of the operating system currently running on the WCD, and (iv) user interface status of the WCD, such as a record of user interface events and responses by the WCD, among possibly others.

In addition, in the exemplary method, the one or more evaluations regarding operation of the WCD may comprise various types of evaluations. Examples of such evaluations include (i) an evaluation of one or more air interface conditions for the WCD and (ii) an evaluation of electrical, mechanical, or other physical operation of the WCD. The evaluation of one or more air interface conditions for the WCD may comprise an evaluation of air interface receive signal strength or other air interface metrics, and the one or more results may then comprise an indication of air interface receive signal strength or other air interface metrics. The evaluation of electrical, mechanical, or other physical operation of the WCD may comprise an evaluation of user interface operation on the WCD or an evaluation of operation of other structural components of the WCD, and the one or more results may then comprise a record of such operation.

Phrased in another way, the exemplary embodiment may take the form of a method that involves conveying to a user a cell phone that is programmed with a Telnet server application and an FTP server application, thereafter receiving from the user a trouble report regarding operation of the cell phone, and responsively performing remote evaluation of the cell phone.

The act of performing the remote evaluation of the cell phone may involve using a Telnet client application on a computer to log in to the Telnet server application on the cell phone via a packet-switched network and via a wireless access network serving the cell phone and to thereby establish a Telnet session between the computer and the cell phone, and through the Telnet session directing the cell phone to perform one or more evaluations. Further, the act may involve using an FTP client application on the computer to log in to the FTP server application on the cell phone via the packet-switched network and via the wireless access network to thereby establish an FTP session between the computer and the cell phone, and through the FTP session downloading from the cell phone to the computer one or more results of the one or more evaluations, for use in troubleshooting the reported trouble.

In still another respect, the exemplary embodiment may take the form of a remote troubleshooting system for a cellular wireless communication device (WCD). Such a system may include at least one server application programmed on the WCD, and a computer having a processor, data storage, and at least one client application stored in the data storage and executable by the processor. The at least one client application may then be executable to log in to the at least one server application of the WCD via a packet-switched network and via a wireless access network serving the WCD, and to thereby establish at least one data session between the computer and the WCD via the packet-switched network and via the wireless access network. Further, the at least one client application is then used at the computer to obtain performance metrics from the WCD via the at least one data session, for use in troubleshooting at least one reported problem in operation of the WCD.

As in the exemplary method, the at least one server application in the exemplary system may include a Telnet server application and an FTP server application, and the at least one client application on the computer may then include a corresponding Telnet client application and a corresponding FTP client application. Further, the WCD in the exemplary system may be a cell phone, or any other WCD.

These as well as other aspects, advantages, and alternatives will become apparent to those skilled in the art by reading the following detailed description, with reference where appropriate to the accompanying drawings.

Furthermore, it should be understood that the description provided in this summary and elsewhere in this document is intended to illustrate the invention by way of example only. Thus, other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and by software, firmware and/or hardware.

DETAILED DESCRIPTION OF AN EXEMPLARY EMBODIMENT

Figure 1:
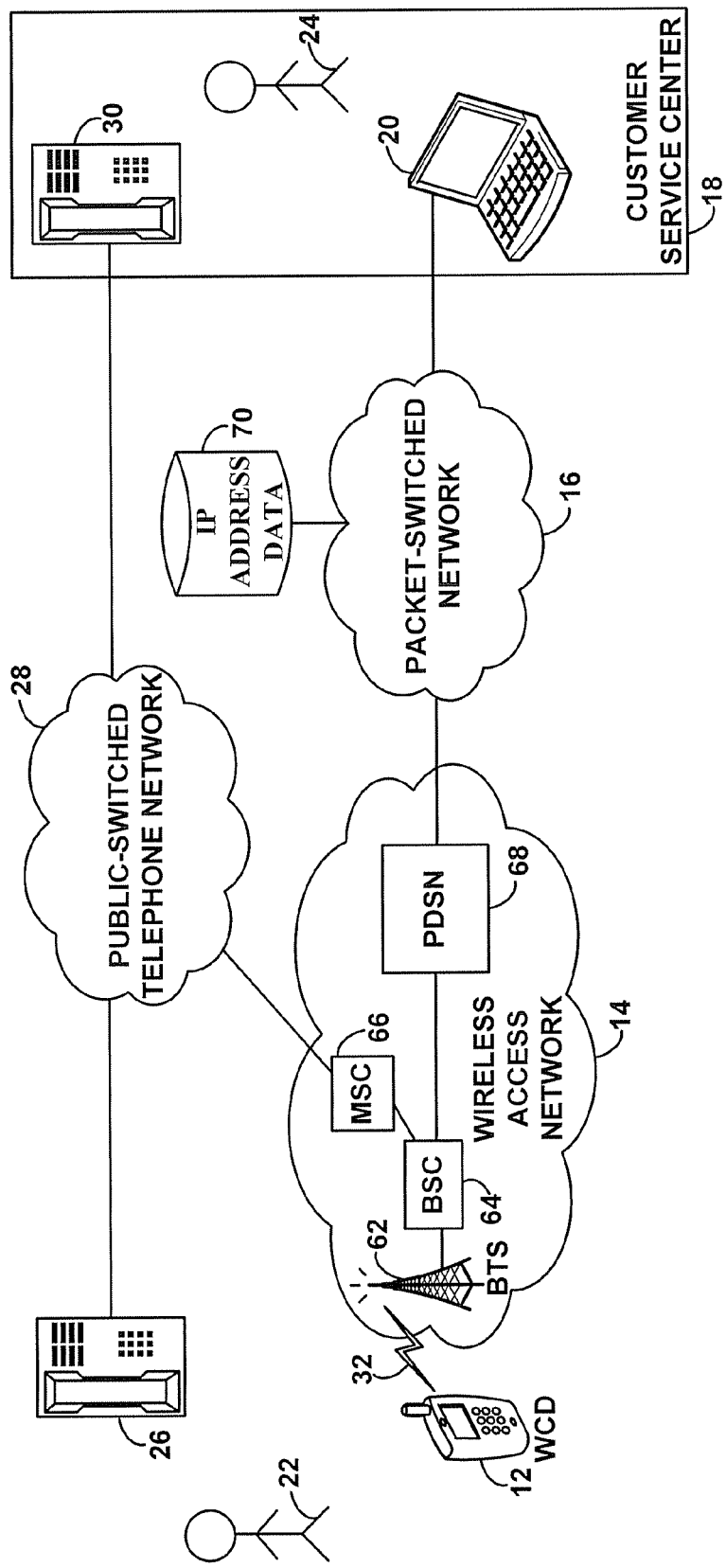
FIG. 1 is a simplified block diagram of a network in which an exemplary embodiment of the invention can be implemented.

Referring to the drawings, FIG. 1 is a simplified block diagram of a network arrangement in which an exemplary embodiment of the invention can be implemented. As shown, the network arrangement includes a WCD 12, a wireless access network 14, a packet-switched network 16, and a customer service center 18 containing a customer service computer 20 coupled with the packet-switched network 16. As further shown, WCD 12 is operated by a user 22, and customer service computer 20 is operated by a customer service person 24. Additionally, user 22 may have access to a telephone 26 coupled with the public switched telephone network 28, and customer service person may have access to a customer service telephone 30 similarly coupled with the public switched telephone network.

WCD 12 is generally any cellular wireless communication device capable of engaging in cellular wireless communication via an air interface 32 with wireless access network 14, and preferably capable of engaging in wireless packet data communication via wireless access network 14. In a preferred embodiment, WCD 12 is a cell phone or wirelessly equipped personal digital assistant (PDA). But WCD 12 could take other forms as well. WCD 12 may communicate with wireless access network 14 according to any of a variety of cellular air interface protocols, such as CDMA, iDEN, TDMA, WiMAX, GSM, GRPS, UMTS, EDGE, and/or LTE, or other protocols now known or later developed.

Figure 2:
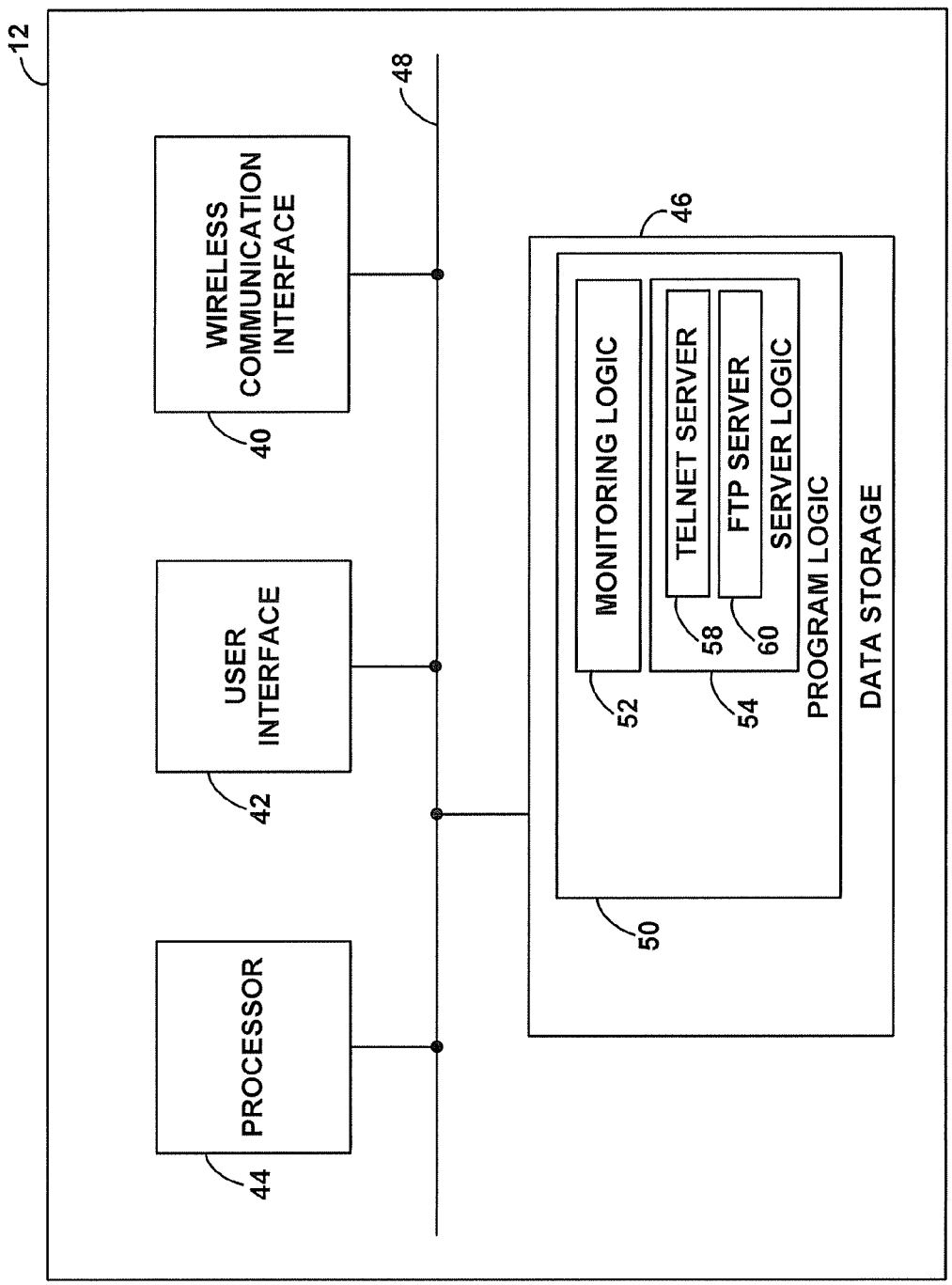
FIG. 2 is a simplified block diagram of a WCD operable in the exemplary embodiment.

Turning briefly to FIG. 2, a simplified block diagram of an exemplary WCD 12 is provided. The exemplary WCD 12 includes a wireless communication interface 40, a user interface 42, a processor 44, and data storage 46, all of which are coupled together by a system bus, network, or other mechanism 48.

Wireless communication interface 40 functions to facilitate communication with wireless access network 14 via air interface 32 according to an agreed protocol such one of the protocols noted above. As such, the wireless communication interface 40 may comprise a mobile station modem (MSM) chipset of the type manufactured by Qualcomm Incorporated, together with one or more antennas, or may take other forms.

User interface 42 functions to facilitate interaction with user 22. User interface 42 may conventionally include input functions such as a keypad, microphone, and touch sensitive screen. Further, user interface 42 may conventionally include output functions such as a display screen and a loudspeaker or headset connection.

Processor 44 may comprise one or more general purpose processors (e.g., INTEL microprocessors) and/or one or more special purpose processors (e.g., digital signal processors or application specific integrated circuits) arranged to carry out various functions described herein. Data storage 46 in turn may comprise one or more volatile and/or non-volatile storage components, such as magnetic, optical, or organic storage for instance, and may be integrated in whole or in part with processor 44. As shown, data storage 46 preferably stores program logic 50 including monitoring logic 52 and server logic 54, each of which may comprise machine language instructions executable by processor 44 to carry out various WCD functions.

Monitoring logic 50 is executable to evaluate (e.g., monitor) aspects of operation of WCD 12, such as various network status and physical device status as described above for instance. As specific examples, monitoring logic 50 may be executable to determine the current, and to record in data storage 46 the results of that evaluation (e.g., measured or existing state values regarding operation of the WCD). Server logic 54 is executable to serve one or more clients that log in to the WCD from a remote location, such as from customer service computer 20 for instance, to allow access to and control of the WCD at defined levels.

Preferably, server logic 54 includes a Telnet server application 58 operable in accordance with well known Telnet principles, as defined by IETF STD 8 and IEFT RFC 854 for instance, and associated with a particular port at WCD 12. Telnet server application 58 is thus arranged so that a corresponding Telnet client application on a remote computer such as computer 20 can log in to the Telnet server application 58 and can thereby issue commands to the WCD to cause the WCD to take various actions, and then receive from the WCD various responses such as data indicating results of the various actions. Alternatively or additionally, the server logic 54 may include an SSH server application or other server application that accomplishes similar functions.

Further, server logic 54 preferably includes an FTP server application 60 operable in accordance with well known FTP principles, as defined by IETF RFC 959 for instance, and associated with a particular port at WCD 12. FTP server application 60 is thus arranged so that a corresponding FTP client application on a remote computer such as computer 20 can log in to the FTP server application 60 and can thereby perform FTP downloads of files stored on the WCD, such as one or more files indicating results of evaluations by monitoring logic 50 for instance. Sever logic 54 may include other file or data transfer server logic as well, and/or the functions of the FTP server application 60 may be integrated together or provided by the Telnet or other server application logic on the WCD. In an alternative embodiment, for instance, server logic 54 may include SFTP logic instead of, or in addition to, FTP logic.

Preferably, server logic 54 is secure, in that the server logic 54 will require a valid username and password and/or other security information to be provided by client logic on a remote computer seeking to log in to the server logic 54. That way, server logic 54 can help to prevent rogue access of the WCD. If secure server logic such as SSH or SFTP is used, secure keys can advantageously be stored on the WCD itself, and reciprocal keys can be stored on the client terminal that will log in to the WCD, to avoid or minimize the need for a user of the client terminal to enter username and password or other security information.

WCD 12 is preferably conveyed to user 22 by a cellular wireless service provider that operates wireless access network and thus provides WCD 12 with cellular wireless communication service. The wireless service provider may convey the WCD 12 to the user by selling or otherwise directly distributing the WCD to the user, or the wireless service provider may convey the WCD 12 to the user through a retail distribution chain or other distribution chain of any level of complexity. The WCD 12 may be configured specifically to interoperate with the wireless service provider's network or may be more generally able to operate with various service provider's networks.

Returning to FIG. 1, wireless access network 14 comprises a cellular wireless network arranged to provide devices such as WCD 12 with wireless network connectivity to packet-switched network 16, public switched telephone network 28, and/or other network resources. Such a wireless access network 14 can take various forms, depending upon the air interface protocol used and upon other factors. As shown by way of example, the wireless access network 14 may include a base transceiver station (BTS) 62 that radiates to define a coverage area in which WCD 12 may communicate with the BTS 62 via air interface 32. Further, the wireless access network 14 may include a base station controller (BSC) (also sometimes referred to as a radio network controller (RNC)) 64, which may control aspects of BTS and air interface operation and may be integrated with BTS 62. BSC 64 may then be coupled with a mobile switching center (MSC) 66 or similar entity that provides connectivity with the public switched telephone network, and BSC 64 may also be coupled with a packet data serving node (PDSN) 68 or other gateway entity that provides connectivity with packet-switched network 16.

Note that in some networks, the functions of various wireless access network components may be assumed by other entities or combined, distributed or arranged in other ways. For instance, in a GSM/GPRS/EDGE network, the functions of the PDSN may be assumed by a Gateway GPRS Serving Node (GGSN). Other variations are possible as well.

In practice, with this example arrangement, WCD 12 may acquire wireless packet data connectivity by sending a connection request via air interface 32 to wireless access network 14. In response to the connection request, BSC 62 may assign air interface traffic channel resources for use by WCD 12 to engage in radio link layer communication of bearer data. (The assignment of air interface traffic channel resources may vary in form depending on the type of air interface protocol used. For instance, in a time division multiplexed system such as 1xEV-DO, the assignment may involve assigning various time slots on the traffic channel for use to carry data to/from the WCD. In a code division multiplexed system such as CDMA, on the other hand, the assignment may involve assigning one or more coded (e.g., Walsh coded) traffic channels for use to carry data to/from the WCD.) Furthermore, the BSC 64 may signal to the PDSN 68, and the PDSN 68 and WCD 12 may then negotiate to establish a data link layer connection. Additionally, the WCD 12 may then signal through the PDSN to a mobile-IP home agent or other entity on the packet-switched network to obtain or register an IP address on network 16.

Provided with its radio link, data link, and IP address, the WCD may then engage in packet-data communication on network 16, via wireless access network 14, and WCD 12 may thereby communicate with other entities on network 16, such as with customer service computer 20 for instance.

In a preferred embodiment, WCD 12 will have an "always on" packet-data connection, in that the WCD 12 will always (or almost always) have an IP address on network 16. The WCD 12 may lose its radio link if it does not communicate packet data for a threshold time period, but, if so, the WCD 12 may newly acquire a radio link if a need thereafter arises for it to send or receive packet data. Having WCD 12 be "always on" advantageously enables other entities on the network to be able to communicate with the WCD, provided that the other entities know the IP address of the WCD.

In the exemplary embodiment, the IP address of the WCD may be stored in a provisioning system, a mobile-IP home agent, or other data store 70 on packet-switched network 16, and may be correlated there with a phone number or other identifier of the WCD (e.g., MIN, MDN, MSID, ISM, etc.), as that identifier may be provided to the system assigning the IP address to the WCD in the first place. Accordingly, an authorized computer such as customer service computer 20 may query that IP address data to determine the IP address of WCD 12, so as to facilitate remotely logging in to the WCD.

Packet-switched network 16 comprises one or more networks through which packet data can be routed in accordance with well known principles. In the exemplary embodiment, the packet-switched network 16 may include a core packet-switched network operated by the WCD's wireless service provider. Further, the network 16 may comprise other networks such as the Internet or other public or private networks.

Customer service center 18 is preferably operated by or for the wireless service provider that serves WCD 12 with cellular wireless communication service, and customer service center 18 functions to receive and respond to calls or other communications regarding WCD operation, such as calls reporting trouble with operation of a given WCD. Customer service center 18 may include multiple operator stations staffed with customer service representatives, such as customer service person 24, and each operator station may be equipped with a customer service computer, such as computer 20, and a telephone, such as telephone 30. In practice, the customer service center 18 may thus receive calls or other communications from users, such as user 22, regarding operation of devices such as WCD 12.

Customer service computer 20 may function to receive trouble reports regarding operations of devices such as WCD 12, by e-mail, web conference, or VoIP communication for instance, and customer service person 24 may respond to those reports. Further, in accordance with the present invention, customer service computer 20 preferably enables the customer service person to remotely log in to WCD 12 so as to cause WCD 12 to carry out various performance monitoring evaluations (tests, measurements, readings, etc.), and so as to obtain the results of those evaluations (e.g., test results, measurements, readings, etc.), for use in troubleshooting reported trouble regarding the WCD.

Figure 3:
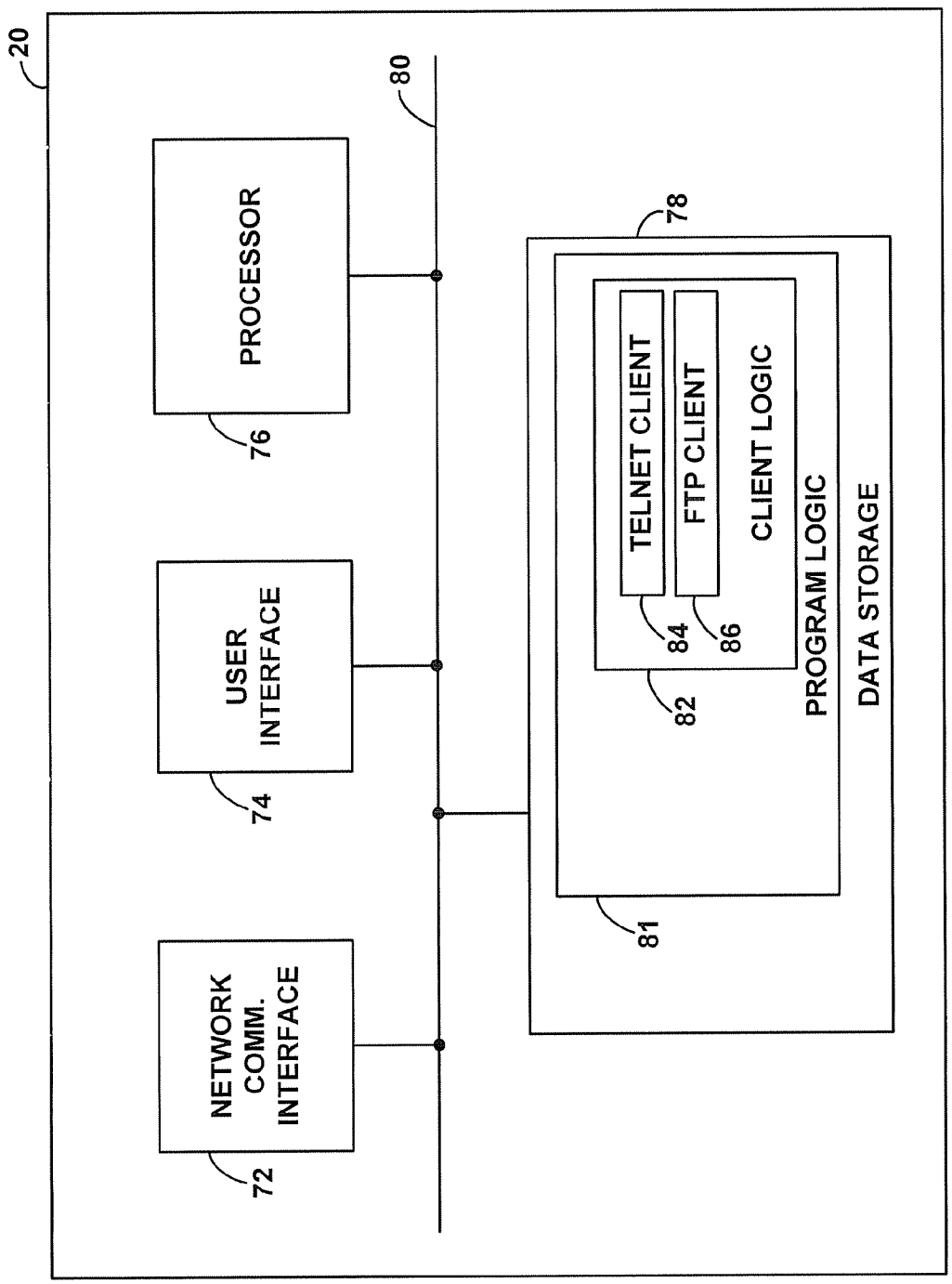
FIG. 3 is a simplified block diagram of a remote computer operable in the exemplary embodiment.

FIG. 3 is a simplified block diagram of an exemplary customer service computer 20. As shown in FIG. 3, the exemplary computer includes a network communication interface 72, a user interface 74, a processor 76, and data storage 78, all of which are coupled together by a system bus, network, or other mechanism 80.

Network communication interface 72 functions to facilitate communication with network 16. As such, network communication interface 72 may comprise a wired or wireless Ethernet module and/or one or more other entities for coupling with network 16. User interface 74, in turn, functions to facilitate interaction with customer service person 24 and may thus conventionally include input mechanisms such as a keyboard and a mouse and output mechanisms such as a display and loudspeaker or headphone connection.

Processor 76 may comprise one or more general purpose processors and/or one or more special purpose processors arranged to carry out various functions described herein. Data storage 78 may then comprise one or more volatile and/or non-volatile storage components and may be integrated in whole or in part with processor 76. As shown, data storage 78 preferably stores program logic 81 including client logic 82 arranged to interact with one or more server applications stored in WCD 12, and comprising machine language instructions executable by processor 78.

Preferably, client logic 82 includes a Telnet client application 84 operable in accordance with well known Telnet principles to interact via packet-switched network 16 and wireless access network 14 with Telnet server application on 58 on WCD 12. Telnet client application 84 is thus arranged so that computer 20 can remotely log in to Telnet server application 58 and can thereby issue commands to the WCD to cause the WCD to take various actions, and then receive from the WCD various responses such as data indicating results of the various actions. Alternatively or additionally, the client logic 82 may include an SSH client application or other client application that accomplishes similar functions.

Further, client logic 82 preferably includes an FTP client application 86 operable in accordance with well known FTP principles to interact via packet-switched network 16 and wireless access network 14 with FTP server application on 60 on WCD 12. FTP client application 86 is thus arranged so that computer 20 can remotely log in to FTP server application 60 and can thereby perform FTP downloads of files stored on the WCD, such as one or more files indicating results of evaluations by monitoring logic 50 for instance. Client logic 58 may include other file or data transfer server logic as well, and/or the functions of the FTP client application 86 may be integrated together or provided by the Telnet or other client application logic on the computer 20.

Each client application defined by client logic 82 may operate by initially prompting a user of computer 20 to specify a server address, username, and password for logging in to the server logic at the WCD, and/or by otherwise determining the necessary server address, username, and password to achieve that login. Traditionally, the server address of a Telnet server or FTP server would be an IP address of the server. Thus, at issue in the exemplary embodiment would be the IP address of WCD 12.

As noted above, the IP address of WCD 12 is preferably stored on network 70 in data 70, keyed to an identity of WCD 12. Thus, provided with the identity of WCD 12, the client logic 82 on computer 20 can ascertain the necessary IP address by querying data 70. Customer service person 24 and/or computer 20 may obtain the identity of WCD 12 by asking the caller or by reading caller-ID information if the trouble report call comes from the WCD 12 itself. Program logic on computer 24 may then automatically, or upon request from person 24, query data 70 to determine the IP address of WCD 12, and the program logic may automatically populate a Telnet or FTP login form with that address.

Furthermore, as noted above, the various server applications on WCD 12 preferably require a username/password or other security parameter(s) to facilitate secure login to the WCD by remote computers such as computer 20. In accordance with the exemplary embodiment, a common username/password could be programmed into each WCD for this purpose, and computer 20 could programmatically populate the Telnet or FTP login form with that common username/password. Alternatively, unique username/password data could be provided per WCD, such as based on a hash keyed to WCD-specific data for instance.

Once the computer 20 has ascertained and populated the necessary login information to facilitate remote login to the WCD server logic, the computer may then proceed with execution of its client logic to send the login information via packet-switched network and wireless access network 14 to WCD 12, where it would be passed to the corresponding server application in WCD 12 in accordance with the respective application port. Basic Telnet, FTP, or other login into the WCD may thereby occur.

Figure 4:
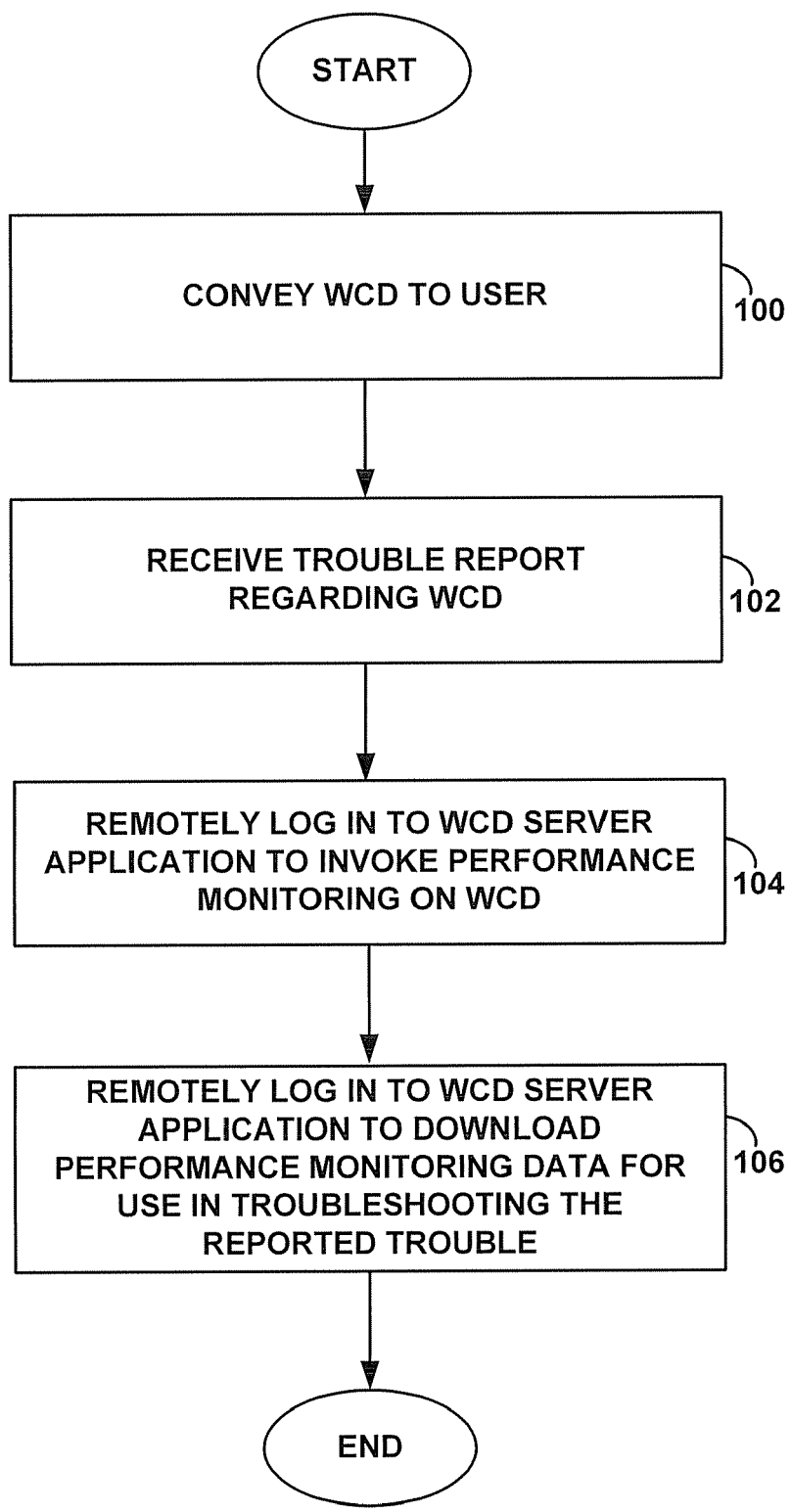
FIG. 4 is a flow chart depicting functions that can be carried out in accordance with the exemplary embodiment.

FIG. 4 is next a flow chart depicting functions that can be carried out in accordance with the exemplary embodiment. As shown in FIG. 4, at step 100, the wireless service provider conveys WCD 12 to user 22, such as by selling it to the user.

At step 102, after using or attempting to use the WCD 12, user 22 then contacts customer service center 18 to report trouble regarding operation of the WCD 12. For instance, user 22 may use WCD 12 to call customer service center 18 if possible, either as a legacy call through public switched telephone network 28 to the customer service telephone 30 or as a VoIP call through network 16. Alternatively, user 22 may operate telephone 26 to place a call to customer service center 18. In any event, customer service person 24 may thereby receive from user 22 a report of trouble regarding operation of WCD 12. In an alternative embodiment, the trouble report could arrive at customer service center 18 in some other manner.

The trouble regarding operation of WCD 12 could take any of a variety of forms. For instance, the trouble may be an inability to place calls or other communications, interference in such communications, a dropped call experience, problems related to physical operation of the WCD, such as operation of user interface 42 or battery power issues, or any other problem or situation that a user or other entity might report regarding operation of a WCD.

In response to the trouble report regarding operation of the WCD, the customer service center 18 will then remotely log in to the WCD 12 in order to invoke performance monitoring evaluation at the WCD and to collect evaluation results for use in troubleshooting the reported trouble regarding operation of the WCD.

In particular, at step 104, the customer service person 24 may invoke/run the Telnet client application 84 on computer 20 in order to remotely log in to the Telnet server application 58 on WCD 12 via packet-switched network 16 and wireless access network 14. Once computer 20 thereby establishes a Telnet session with the Telnet server application 58 on WCD 12, customer service person 24 may then use computer 20 as a terminal of WCD 12, and may thus issue commands to the WCD, just as if person 24 were at WCD 12. Person 24 may thereby read various status settings of WCD 12 and/or may direct WCD 12 to take various performance monitoring actions such as to record air interface conditions (e.g., signal strength, dropped calls with GPS location, serving sector IDs, etc.) or to record user interface events (such as keypad usage, display screen content, etc.) for instance.

Through this Telnet session, the customer service person may obtain and record in computer 20 various performance monitoring data regarding operation of WCD 12, such as physical operation of the WCD and/or its environment. Person 24 may then analyze the data in an attempt to troubleshoot the reported trouble regarding operation of WCD 12, such as to determine what if anything is not functioning correctly, so that the problem if any can be resolved. Further, computer 20 may then publish that data to a central server in customer service center 18 or otherwise make the data available for other troubleshooting efforts or problem tracking.

Note also that the customer service person 24 may invoke performance monitoring on WCD 12 in other ways as well. For instance, the person 24 may send a coded SMS message to WCD 12 to which the WCD 12 would respond by engaging in particular (e.g., specified) performance monitoring tasks and perhaps recording its results. Or if the user 22 calls the customer service center from the WCD 12 itself, the customer service center could issue DTMF or other commands to the WCD within that call to invoke the performance monitoring. Still alternatively, the customer service person 24 could walk the user 22 manually through a process of setting the WCD to engage in one or more performance monitoring functions.

In addition, at step 106, the customer service person 24 may invoke/run the FTP client application 86 on computer 20 in order to remotely log in to the FTP server application 60 on WCD 12 via packet-switched network 16 and wireless access network 14. Once computer 20 thereby establishes an FTP session with the FTP server application 60 on WCD 12, customer service person 24 may then use computer 20 to perform FTP downloads of evaluation records established by WCD 12 or otherwise to download pertinent performance monitoring or other data from WCD 12 for further use in troubleshooting. As with any data obtained through the Telnet session, computer 20 may publish or otherwise make the data available for reference by others as well.

Advantageously, with the benefit of the invention, a customer service representative can assist a WCD user by troubleshooting reported problems regarding operation of the WCD without requiring the user to bring the WCD to a customer service center. Furthermore, by remotely logging in to the WCD via a wireless access network connection to the WCD, the customer service representative can observe or otherwise learn about actual conditions affecting the WCD and/or actual status of the WCD in its real operating environment.

An exemplary embodiment of the present invention has been described above. Those skilled in the art will appreciate, however, that many changes from the foregoing description are possible while remaining with the scope of invention as claimed.

What is claimed is:

1. A method comprising:
conveying to a user a cellular wireless communication device (WCD) that is programmed with at least one server application;
thereafter receiving a trouble report regarding operation of the WCD; and
responsive to the trouble report, (a) using at least one client application on a computer to log into the at least one server application on the WCD via a packet-switched network and via a wireless access network serving the WCD and to thereby establish at least one data session between the computer and the WCD via the packet-switched network and the wireless access network, wherein logging into the at least one server application on the WCD comprises providing the WCD with a password, and (b) communicating with the WCD through the at least one data session, so as to cause the WCD to conduct one or more evaluations regarding operation of the WCD and so as to download to the computer from the WCD one or more results of the one or more evaluations, for use in troubleshooting the reported trouble.

2. The method of claim 1, wherein the WCD is a cell phone.

3. The method of claim 1, wherein the wireless access network serves the WCD through an air interface under a protocol selected from the group consisting of CDMA, iDEN, TDMA, WiMAX, GSM, GRPS, UMTS, EDGE, and LTE, and wherein each of the at least one data session thus extends through the air interface.

4. The method of claim 1, wherein conveying the WCD to the user comprises selling the WCD directly or indirectly to the user.

5. The method of claim 1, carried out by a wireless service provider that provides the WCD with communication service.

6. The method of claim 1, wherein receiving the trouble report comprises receiving a call to a customer service center from the user and receiving the trouble report from the user during the call.

7. The method of claim 6, wherein the computer is a customer service computer operated by a customer service representative who answers the call.

8. The method of claim 6, wherein receiving the call comprises receiving the call from the WCD.

9. The method of claim 1,
wherein the at least one client application comprises a Telnet client application,
wherein the at least one server application comprises a Telnet server application,
wherein using the at least one client application on the computer to log into the at least one server application on the WCD via a packet-switched network and via a wireless access network serving the WCD and to thereby establish at least one data session between the computer and the WCD via the packet-switched network and the wireless access network comprises using the Telnet client application to log into the Telnet server application, and
wherein the at least one data session between the computer and the WCD thus comprises a Telnet session between the computer and the WCD.

10. The method of claim 9, wherein communicating with the WCD through the at least one data session, so as to cause the WCD to conduct one or more evaluations regarding operation of the WCD and so as to download to the computer from the WCD one or more results of the one or more evaluations comprises:
sending one or more commands from the computer via the Telnet session, and thus via the packet-switched network and wireless access network, to the WCD to cause the WCD to conduct the one or more evaluations.

11. The method of claim 10,
wherein the at least one client application further comprises an FTP client application,
wherein the at least one server application further comprises an FTP server application,
wherein the at least one data session between the computer and the WCD further comprises an FTP session between the computer and the WCD, and wherein communicating with the WCD through the at least one data session so as to download to the computer from the WCD one or more results of the one or more evaluations comprises engaging in FTP file transfer to download the one or more results from the WCD to the computer via the packet-switched network and wireless access network.

12. The method of claim 1, further comprising:
through the at least one data session, the computer ascertaining one or more characteristics of the WCD.

13. The method of claim 12, wherein ascertaining the one or more characteristics of the WCD comprises sending to the WCD one or more commands to read the one or more characteristics from the WCD, and receiving in response from the WCD indications of the one or more characteristics.

14. The method of claim 12, wherein the one or more characteristics of the WCD comprises a characteristic selected from the group consisting of (i) a network communication setting of the WCD, (ii) a battery power level of the WCD, (iii) a version of software or firmware in the WCD, and (iv) user interface status of the WCD.

15. The method of claim 1, wherein the one or more evaluations regarding operation of the WCD comprise an evaluation selected from the group consisting of (i) an evaluation of one or more air interface conditions for the WCD and (ii) an evaluation of electrical, mechanical, or other physical operation of the WCD.

16. The method of claim 15, wherein the evaluation of the one or more air interface conditions for the WCD comprises an evaluation of air interface receive signal strength, and wherein the one or more results comprises an indication of air interface receive signal strength detected by the WCD.

17. A method comprising:
conveying to a user a cell phone that is programmed with a Telnet server application and an FTP server application;
thereafter receiving from the user a trouble report regarding operation of the cell phone; and
responsive to the trouble report, (a) using a Telnet client application on a computer to log into the Telnet server application on the cell phone via a packet-switched network and via a wireless access network serving the cell phone and to thereby establish a Telnet session between the computer and the cell phone, and through the Telnet session directing the cell phone to perform one or more evaluations, and (b) using an FTP client application on the computer to log into the FTP server application on the cell phone via the packet-switched network and via the wireless access network to thereby establish an FTP session between the computer and the cell phone, and through the FTP session downloading from the cell phone to the computer one or more results of the one or more evaluations, for use in troubleshooting the reported trouble.

18. A remote troubleshooting system for a cellular wireless communication device (WCD), the system comprising:
a Telnet server application and an FTP server application programmed on the WCD;
a computer having a processor, data storage, and a Telnet client application and an FTP client application stored in the data storage and executable by the processor,
wherein the Telnet client application is executable to log into the Telnet server application of the WCD via a packet-switched network and via a wireless access network serving the WCD, and to thereby establish a Telnet session between the computer and the WCD via the packet-switched network and via the wireless access network,
wherein the FTP client application is executable to log into the FTP server application of the WCD via the packet-switched network and via the wireless access network, and to thereby establish an FTP session between the computer and the WCD via the packet-switched network and via the wireless access network, and
wherein the Telnet client application and the FTP client application are used at the computer to obtain performance metrics from the WCD via the Telnet session and the FTP session, for use in troubleshooting at least one reported problem in operation of the WCD.

19. The system of claim 1, wherein the WCD comprises a cell phone.

* * * * *